United States Patent [19]

McAlindon

[11] Patent Number: 5,638,062

[45] Date of Patent: Jun. 10, 1997

[54] ERGONOMIC INPUT DEVICE

[76] Inventor: Peter J. McAlindon, 2297 River Park Cir. No. 1233, Orlando, Fla. 32817

[21] Appl. No.: 567,596

[22] Filed: Dec. 5, 1995

[51] Int. Cl.[6] .................................................. H03K 17/94
[52] U.S. Cl. .............................. 341/20; 341/21; 345/161; 400/485; 400/715; 361/680
[58] Field of Search ............................ 341/20, 21, 22, 341/35; 345/160, 161, 167, 168, 169, 184; 364/708.1, 709.01, 709.12, 709.15; 400/472, 473, 489, 485, 492, 482, 715; 200/6 A, 6 R; 361/680, 686; 312/208.1; 74/471 XY

[56] References Cited

U.S. PATENT DOCUMENTS

| | | | |
|---|---|---|---|
| 4,782,327 | 11/1988 | Kley et al. | 341/20 |
| 5,017,030 | 5/1991 | Crews | 400/485 |
| 5,045,842 | 9/1991 | Galvin | 345/161 |
| 5,067,834 | 11/1991 | Szmanda et al. | 400/489 |
| 5,122,786 | 6/1992 | Rader | 312/208.1 |
| 5,137,384 | 8/1992 | Spencer et al. | 400/715 |
| 5,228,356 | 7/1993 | Chuang | 345/161 |
| 5,252,952 | 10/1993 | Frank et al. | 345/168 |
| 5,383,735 | 1/1995 | Smiley | 341/22 |
| 5,396,222 | 3/1995 | Markus et al. | 341/20 |
| 5,408,621 | 4/1995 | Ben-Arie | 400/485 |
| 5,473,325 | 12/1995 | McAlindon | 341/20 |

FOREIGN PATENT DOCUMENTS 0205726  12/1986  European Pat. Off. .

OTHER PUBLICATIONS

IBM® Technical Disclosure Bulletin, vol. 23, No. 2, pp. 838–839, ©Jul. 1980.

*Primary Examiner*—Jeffery Hofsass
*Assistant Examiner*—Andrew Hill

[57] ABSTRACT

An input device is described for generating a keystroke signal. A dome shaped to conform to the shape of a human hand at rest is supported to slide along a generally planar base top. The position of the dome on the base top, which is divided into sectors, is sensed, each sector correlatable with a keystroke signal. A system is also provided for outputting two position signals that are then correlatable into a unitary keystroke signal.

15 Claims, 6 Drawing Sheets

FIXED OUTER RING

ERGONOMIC INPUT DEVICE

BACKGROUND OF THE INVENTION

1. Field of the Invention

The present invention relates to input devices for computers and word processors and, more particularly, to ergonomic input devices for minimizing repetitive use injuries and for accommodating users of different physical abilities.

2. Description of Related Art

The development of ergonomically designed keystroke input devices as well as ergonomically designed cursor tracking devices has resulted from an increased awareness and identification of physical problems associated with the use of conventional typewriter-like keyboards and mice. An ergonomically designed keyboard attempts to create a key layout that reduces finger travel and fatigue; promotes a more natural hand, wrist, and arm typing posture through design and support structures; or employs various key activation schema in order to enhance typing performance. An ergonomically designed mouse promotes more natural hand, wrist, and finger positions.

Owing to the proliferation and availability of data entry systems, there has been a dynamic growth in the use of keyboard devices. Various annoying and debilitating muscular syndromes have accompanied this expansion, resulting from the repetitive and fatiguing hand, wrist, and finger motions that are required in the use of conventional typewriter-like keyboards. There has been a growing concern over neuromuscular injuries among clerical workers, journalists, computer programmers, and others who use computers or typewriters extensively. These injuries, one widely publicized of which is carpal tunnel syndrome, translate not only into pain and potential disability for the affected users, but also into significant loss of money, time, and productivity for businesses. Attention to these problems is not new in the art, as is evidenced by many serious attempts to alleviate keyboard-use "injuries" through innovative keyboard layouts, architectural designs, and support devices for the user's body parts to encourage "correct" posture during the use of keyboards.

Typewriter key force, repetition, posture, rest, and stress are major factors to be considered in controlling and eliminating keyboard-related injuries (KRIs). Analysis of each factor, both independently and in relation to one another, is necessary in designing a keyboard that eliminates or reduces KRIs, force and repetition being perhaps the most important in the development of an ergonomically designed keyboard. Force is related to the musculature and conformation of the fingers and hands, which place limitations on their ability to perform a given task.

An abundance of human-computer interaction literature has suggested that some of the recently developed alphanumeric input devices may be more efficient, easier to learn, and may cause less physical trauma than conventional typewriter-like keyboards. Of these recently designed keyboards, most incorporate one or more design features that enhance typing performance and reduce or eliminate fatigue or injury. These design features include: (1) splitting the keyboard to minimize wrist deviations; (2) key contouring and flexible key mapping to minimize finger travel; (3) built-in hand and arm support; (4) a ternary capability in which keys rock back and forth to type; (5) a capability to rotate and tilt the device into numerous positions; and (6) a chordal capability, in which more than one key must be depressed for a single character to be output.

In reference to eliminating or reducing force and repetition fatigue factors, three approaches taken in the prior art are illustrated in U.S. Pat. No. 4,332,493, issued to Einbinder, U.S. Pat. No. 4,849,732, issued to Dolenc, and U.S. Pat. No. 5,178,477, issued to Gambaro.

Other issued patents that address modified keyboard and character arrangements include U.S. Pat. No. 4,244,659, issued to Malt, U.S. Pat. No. 4,509,873, issued to Ryan, U.S. Pat. No. 4,579,470, issued to Casey, U.S. Pat. No. 4,597,681, issued to Hodges, U.S. Pat. No. 4,655,621, issued to Holden, U.S. Pat. No. 5,006,001, issued to Vulcano, U.S. Pat. No. 5,017,030, issued to Crews, U.S. Pat. No. 5,029,260, issued to Rollason, U.S. Pat. No. 5,067,834, issued to Szmanda, U.S. Pat. No. 5,087,910, issued to Guyot-Sionnest, and U.S. Pat. No. 5,137,384, issued to Spencer. None of these addresses the issues of keyboard use and motion injuries.

Computing devices are regularly used for relatively long periods of time by people of all ages and abilities, it is becoming increasingly important that a device also accommodate the physically challenged. Prior art devices in general demand considerable manual and digital dexterity to operate, making them difficult for some portion of the population to utilize efficiently and effectively.

Two types of hand rests, both for partial and full hand support, have been identified in the prior art. One kind acts as an actuator and is not intended to support a substantial part of the weight of the hand, but instead to impart some function. Another type of hand rest known in the art serves only to space the fingers from the proximity-actuated keys to avoid accidentally operating the keys.

A further problem in the art is the use of input devices in hostile environments or under nonideal conditions, such as while wearing gloves. Standard keyboards are extremely difficult to use without unencumbered fingers, owing to the conventional spacing and key layouts of such devices.

My previous patent, "Ergonomic Human-Computer Interface Apparatus and Method," Ser. No. 08/473,325, filed Aug. 11, 1993, now issued U.S. Pat. No. 5,473,325, has addressed the ergonomic effects of keyboards with a dome-shaped input device, used either alone or in pairs via chording, that is rocked from a home position to actuate a keystroke.

SUMMARY OF THE INVENTION

It is an object of the invention to provide an ergonomic input device for generating keystroke signals.

It is an additional object to provide such an input device operable without the use of finger and/or wrist movement.

It is another object to provide such an input device operable with a swiveling motion of a dome-shaped device.

It is a further object to provide an input device system for generating a keystroke signal from the chording of signals generated by a pair of input devices, one operated by each hand.

These and other objects are achieved by the input device of the present invention, which is for generating a keystroke signal that is typically for communication to a processor, wherein the keystroke signal is electronically translated into a keystroke, such as for word processing applications on a computer, although the invention is not intended to be limited to such an application.

The input device comprises a base that has a bottom and a generally planar top. Upon the base top is situated a dome that is shaped generally to conform to a shape of a human hand at rest. Such a shape minimizes static muscle loads in the upper extremities. The dome preferably has a generally smooth bottom edge to permit a smooth sliding movement upon the top of the base. The dome is supported by means for supporting the dome for sliding movement upon the base top.

The input device further comprises means in communication with the dome support means for sensing a position of the dome upon the base top. This sensed position is then electronically correlatable with a keystroke signal, which in use is then communicated to the electronic translation means.

In a particular embodiment of the input device, the position-sensing means comprises a downwardly depending protrusion and the base further comprises a generally circular groove that is dimensioned to accommodate the protrusion. The dome support means top end is swivelable about the dome support means bottom end, so that, when the protrusion is positioned in the groove, the dome is movable in a generally circular path, so that the protrusion tracks along the groove. In this case, the position-sensing means further comprises means for sensing a radial position of the protrusion.

In another embodiment of the input device, the base has a bottom and a generally planar top with a slot therein. The dome has a generally smooth bottom edge and is supported for smooth sliding movement upon the base top along the base top slot. A plurality of means are spacingly positioned along the base top slot for sensing the dome's position of the dome, which is, as above, correlatable with a keystroke signal.

The invention further provides a system for generating a keystroke signal to a processor. The system comprises a pair of input devices as described above, wherein each input device provides a position signal. The pair of position signals are then sensed and correlated with a unitary keystroke signal; thus the position signals are "chorded" to produce one keystroke signal. Therefore, in use the user slides (or swivels) the dome of one input device with a left hand to a desired left position and the dome of the other input device with a right hand to a desired right position. The correlating means then correlates the pair of sensed position signals with a desired keystroke signal. The keystroke signal is output when either of the domes is pressed downward, activating a switch.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–10. Two particular embodiments will be discussed in the following: one incorporating a swiveling movement of the dome and one incorporating a sliding movement of the dome along a slot in the base.

The Swiveling Dome Embodiment

Figure 1:
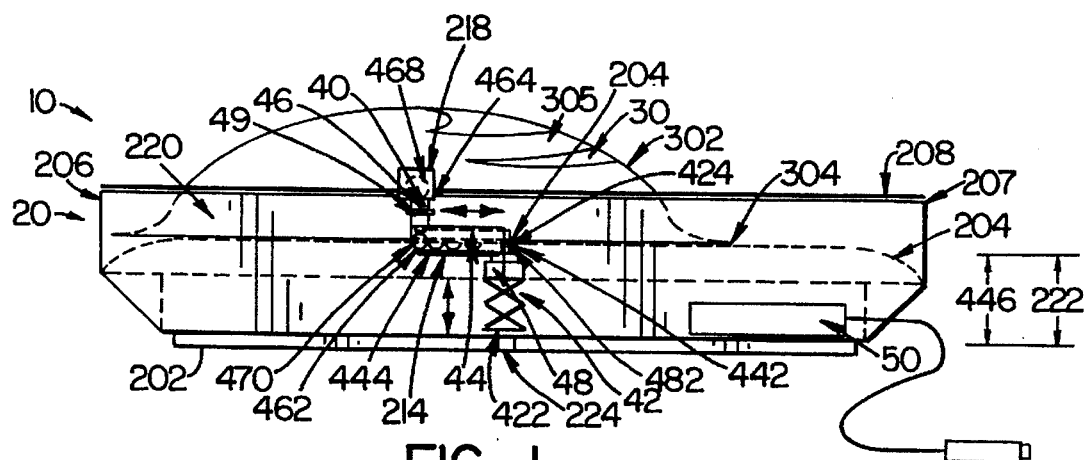
FIG. 1 is a side cross-sectional view of the swiveling dome embodiment.
Figure 2:
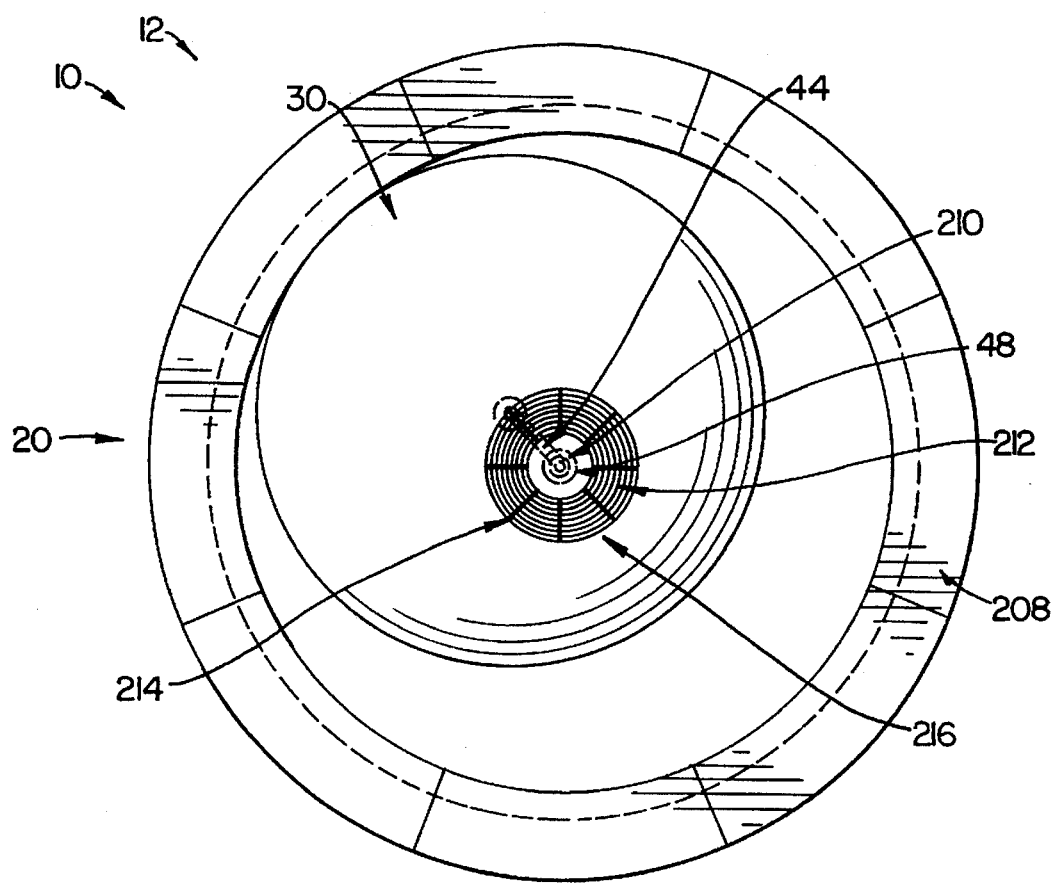
FIG. 2 is a top plan view of the swiveling dome embodiment, illustrating the dome support structure.

The input device 10 in this embodiment, shown in FIGS. 1 and 2, comprises a generally cylindrical base 20 that has a bottom 202 and a generally planar top 204. The base bottom 202 is typically flat to permit the device 10 to rest upon a surface such as a work table. Means may also be provided for preventing slippage during use, such as a rubber-type material affixed to the base bottom 202.

Figure 3:
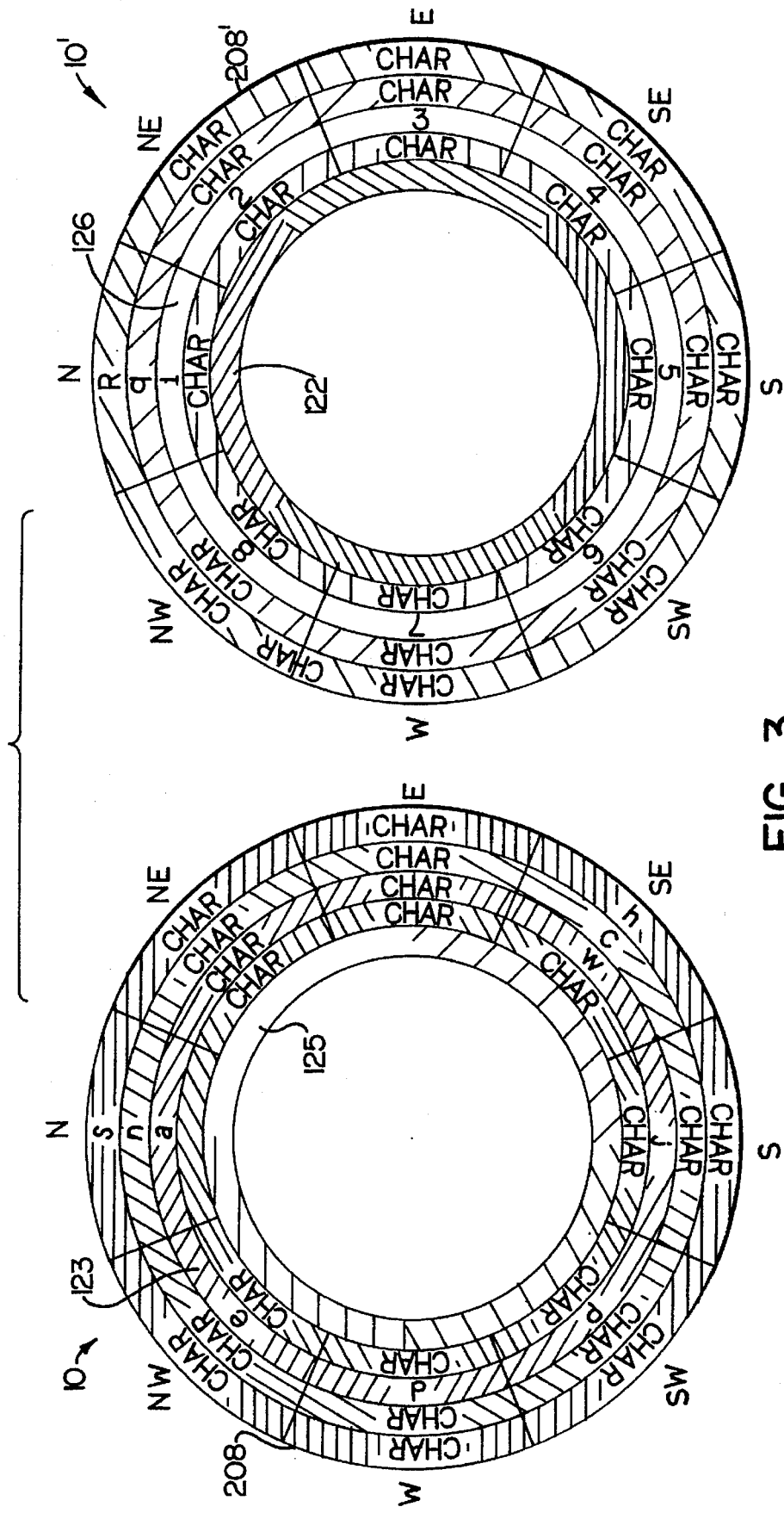
FIG. 3 is an exemplary key layout for the two-swiveling-dome embodiment.

The base top 204 is recessed beneath a circumferential lip 206 to restrain the dome 30 from moving off the base 20. An annular disc 208 affixed to the top 207 of the lip 206 contains indicia for reference by the user that indicate the key layout (FIG. 3). The table indicates how to position and manipulate the bowls to output an exemplary set of characters.

TABLE 1

| Character | Bowl 1 Position | Bowl 2 Position | Bowl Clicked |
| --- | --- | --- | --- |
| s | N | S | 1 |
| n | N | E | 1 |
| d | W | N | 1 |
| j | S | N | 1 |
| r | SE | N | 1 |
| a | N | N | 1 |
| w | SW | N | 2 |
| q | SE | N | 2 |
| 1 | NE | N | 2 |
| 2 | NE | NE | 2 |
| 3 | NE | E | 2 |
| 4 | NE | SE | 2 |

A generally central hole 210 in the base top 204 is provided. Circumscribing the hole 210 is a plurality of concentric circular grooves 212. The grooves 212 have a plurality of radially extending indentations 214 therein that divide the grooves 212 into radial sectors 216. These indentations 214 will be seen in the following to provide a positive indication of a radial sector location of the dome 30 to the user.

The dome 30 is shaped generally to conform to the shape of a human hand at rest. In a particular embodiment, the dome 30 can be molded to have an indentation 305 in its top surface 302 that is shaped to conform to the palm side of a particular user's hand at rest. This feature is for improving ergonomic characteristics, since such an indentation 305 will better support that person's hand during use and will increase comfort during use.

The dome 30 further has a generally smooth bottom edge 304 to permit a smooth sliding movement upon the base top 204.

The input device 10 additionally comprises dome support means 40, which comprises a support member 42 that has a bottom end 422 affixed to the base bottom 202, a top end 424 that extends through the hole 210 in the base top 204, and a height 446 that is generally commensurate with the vertical distance 222 from the base bottom 202 to its top 204. A generally horizontal first arm 44 is pivotably affixed at a first end 442 to the support member top end 424, and is pivotable generally in a horizontal plane. A generally vertical second arm 46 is pivotably affixed adjacent a bottom end 462 to the first arm second end 444. The second arm 46 is pivotable generally about a vertical axis.

Affixed at a top end 464 of the second arm 46 is a freely rotatable ball 468 that mates with a cavity 218 on the dome's underside 220 for pivotably coupling the second arm 46 to the dome 30. The dome support means 40 thereby supports the dome 30 for pivoting movement upon the base 20 in a generally circular path.

Means for sensing a radial position of the dome 30 upon the base top 204 relative to the first arm 44 are provided, wherein the sensed position is correlatable with a keystroke signal. The position-sensing means in this embodiment comprises a downwardly depending protrusion 470 (such as a spring-loaded ball bearing) that is affixed to the second arm's bottom end 462. The protrusion 470 is dimensioned and radially positioned to fit within each of the grooves 212. When the protrusion 470 is positioned in one of the grooves 212, the dome 30 is movable in a generally circular path around the support member 42, the protrusion 470 tracking along the groove 212. The protrusion 470 is affixed so as to permit some measure of vertical movement and feedback to the user so that, when the protrusion 470 encounters one of the indentations 214, the movement is perceptible by the user. Thus the indentations 214 coupled with the movability of the protrusion 470 provides a means for the user to determine the position, i.e., a radial sector 216 location, of the protrusion 470.

The position-sensing means further comprises a means for sensing the radial position of the protrusion 470, which may take the form of a rotary encoder or potentiometer 48 in communication with the first arm 44 and the support member 42. Thus when the first arm 44 swivels about the support member 42, the absolute rotary encoder arm 482 also turns. Electronics are then provided, by means well known in the art, to correlate the absolute rotary encoder signal with a keystroke signal when the keystroke signal is output.

In order to provide the user with a means for outputting the keystroke signal when the dome 30 has been moved to a chosen radial sector 216, a pressure-sensitive switch 49 is positioned in the second arm 46 adjacent the protrusion 470. Thus when the dome 30 is pressed downward, which typically will provide the sensation of a "clicking," the protrusion 470 pushes against the switch 49, activating the switch 49, and providing a signal that a key selection has been made by the user. The commensurate keystroke signal is then output to the processor 50 (connection not shown), wherein it is converted to the keystroke desired by the user for use in applications such as word processing, although the invention is not intended to be limited to such a use.

An alternative embodiment comprises a button mounted on the dome pressable by a finger, typically, the index finger, in similar fashion to a "mouse" button. The button is for activating a switch upon a downward movement, which in turn actuates a keystroke.

The input device 10 can be tailored to a specific user's desired range of motion. This is accomplished by providing a plurality of attachment points on the first arm 44 for the second arm 46. These attachment points coincide with the plurality of grooves 212. Therefore, when the attachment point closest to the hole 210 is chosen, the protrusion 470 will be positioned to travel about the closest-in groove 212, and the smallest amount of circumferential motion by the dome 30 is permitted. Likewise, when the attachment point farthest away from the hole 210 is chosen, the protrusion 470 will be positioned to travel about the farthest-out groove 212, and the largest amount of circumferential motion by the dome 30 is permitted.

In order to provide the capability of outputting a larger number of keystroke signals than would be practicable with a single input device 10, a further aspect of the invention is a system 12, which comprises a pair of input devices 10,10' one for each hand of the user, each input device generating a position signal that is chorded into the desired keystroke signal.

In using the pair of input devices 10,10' the indicia on the annular discs 208,208' are utilized to determine the correct position of both domes 30 to output the desired keystroke signal. A particular embodiment for a chording scheme is shown in FIG. 3. These indicia are used by choosing a coded sector on one input device and a corresponding symbol having the same code with the other input device. For example, swiveling into the light grey sector 122 with the right-hand device 10' and the NW sector 123 having the letter "e" thereon within the light grey ring 124 with the left-hand device 10 will cause a keystroke signal corresponding to "e" to be output upon vertical activation by pressing down left-hand dome 10. Similarly, choosing the white sector 125 with the left-hand device 10 and the sector 126 having the number "1" thereon within the white ring 127 with the right-hand device 10' will cause a keystroke signal corresponding the "1" to be output upon vertical activation by pressing down right-hand dome 10'. Additional examples of keystroke activation are provided in FIG. 3.

In an alternate embodiment of the invention, as above for the single-device embodiment, a button on one of the domes 10 or 10' can be depressed, in a similar fashion to the button on a conventional mouse, to activate and output a keystroke signal.

Figure 4:
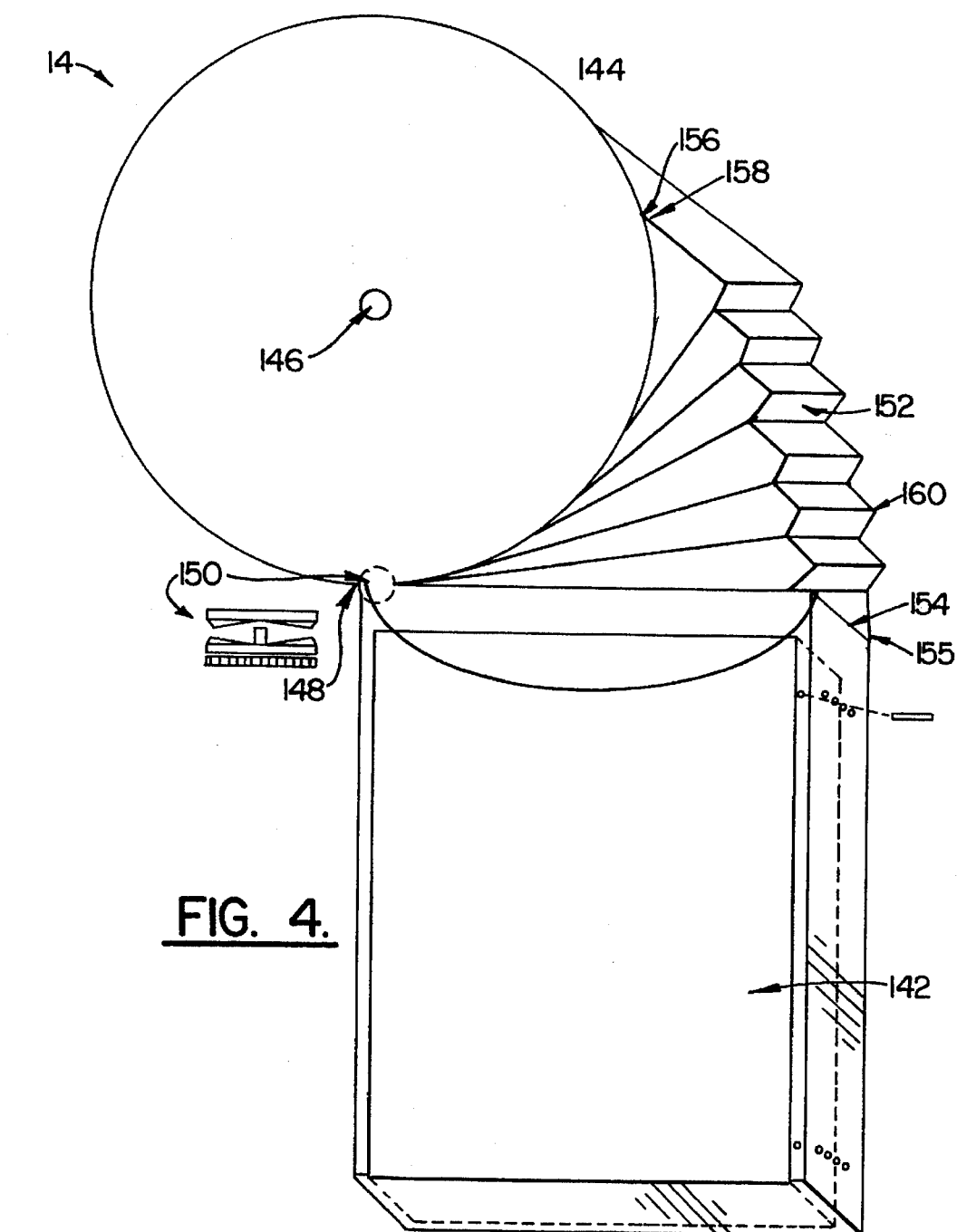
FIG. 4 illustrates an ergonomic arm support for use with the swiveling dome.

An additional feature of the present invention comprises an arm support 14, which is shown in FIG. 4 and comprises a support portion for supporting the user's forearm. In a preferred embodiment, this comprises an adjustable-height, padded box 142.

The arm support 14 further comprises a generally cylindrical base holder 144 that has means for affixing the base thereto, such as any means known in the art, for example, a screw 146 that fits into a threaded bore 224 in the bottom 202 of the base 20.

The base holder 144 is pivotably affixed to an inner distal section 148 of the support portion 142 with a pivot 150 that is lockable in one of a plurality of positions. This permits the base holder 144 to be rotated radially, that is, toward the thumb of the user, by approximately 45 degrees, to optimize the comfort and ergonomic position of the wrist.

The base holder 144 and the support portion 142 are connected by an extendable joint portion 152 that is affixed at a proximal edge 154 to a distal edge 156 of the support portion 142 and at a distal edge 155 to an outer section 158 of the base holder 144. The joint portion 152 is adapted to fan out along its outer edge 160, the fanning and the pivot 150 thereby permitting the base holder 144 to be moved in an inward (radial) and distal direction and further permitting a user to lockably orient the base holder 144 and the support portion 142 in an optimal position for maximum comfort of the user's hand, wrist, and forearm.

The Slotted-Base Embodiment

Figure 5:
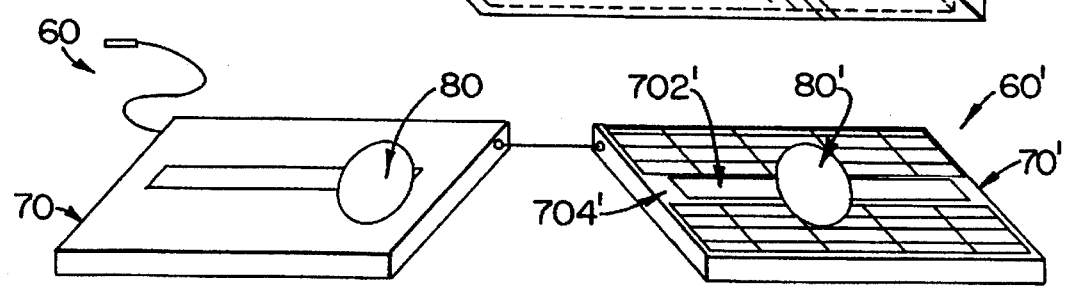
FIG. 5 is a perspective view of the housing and dome of the slotted-base embodiment.

The slotted-base embodiment of the present invention is depicted in FIGS. 5–10. In this embodiment of the input device 60, the base 70 has a slot 702 along the generally planar top surface 704, along which the dome 80 is adapted to slide, supported by dome support structure 62. The dome 80 has a generally flat bottom 802. While the slot 702 is shown in FIG. 5 to be linear, in other embodiments it may also be arcuate or any other desired shape. Typically the slot 702 is positioned generally perpendicular to the user's forearm.

Figure 9:
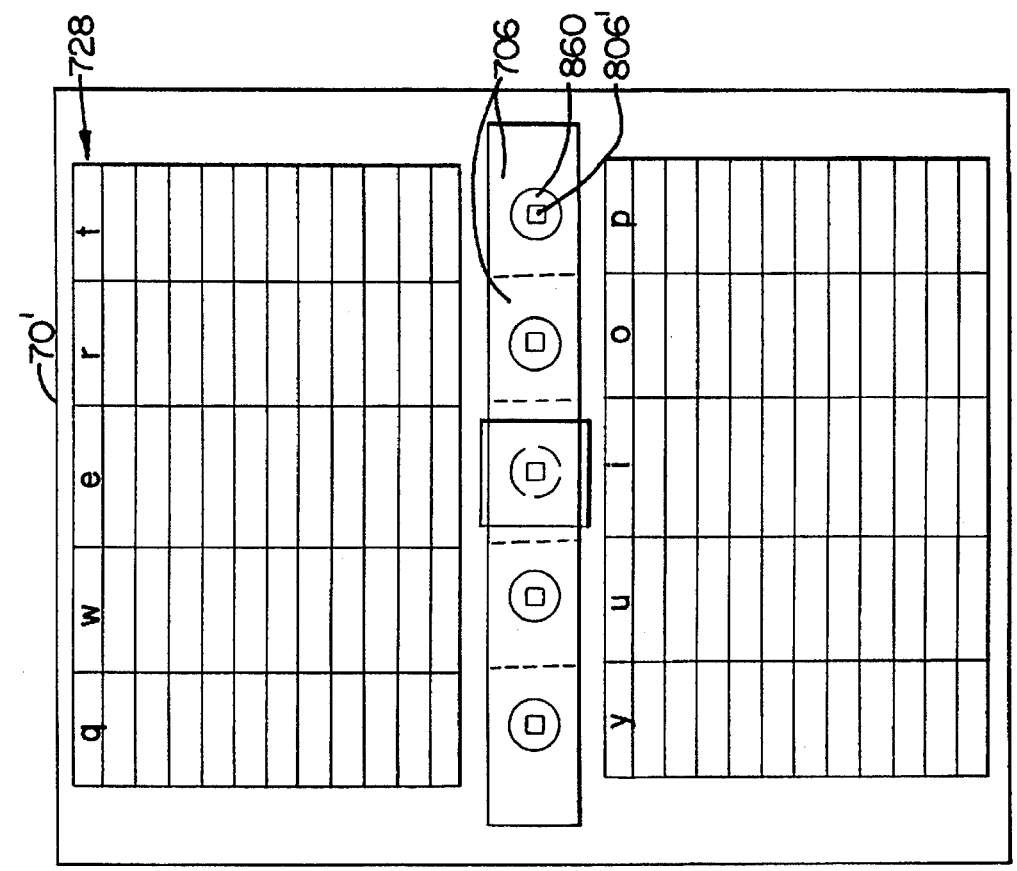
FIG. 9 is an exemplary key layout for the two-dome slotted-base embodiment.
Figure 9:
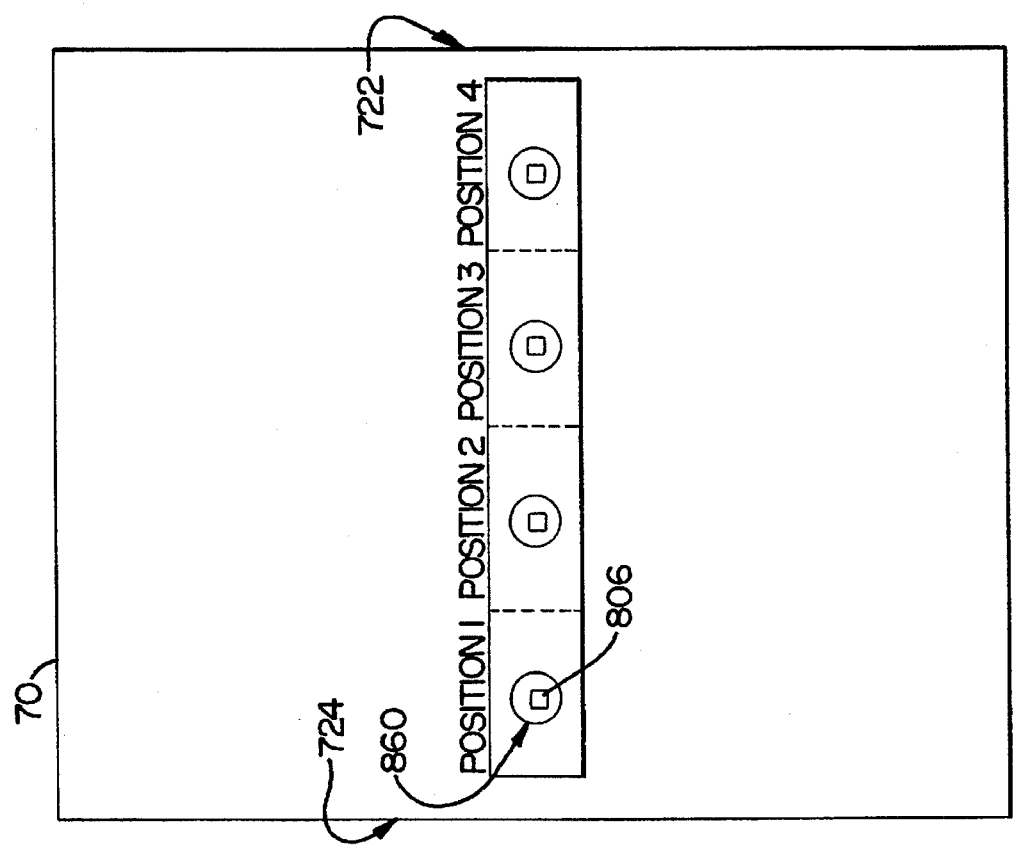

In this embodiment the base top slot 702 comprises a plurality of sectors 706. Within each sector 706 is an indexing means for providing feedback to a user that the dome 80 has been positioned within a sector 706 (FIG. 9). In the embodiment shown in FIG. 6, the indexing means is shown to comprise an indentation 860 into which a downwardly depending protrusion on the dome support means will be shown to be movable to provide positive location.

Figure 8:
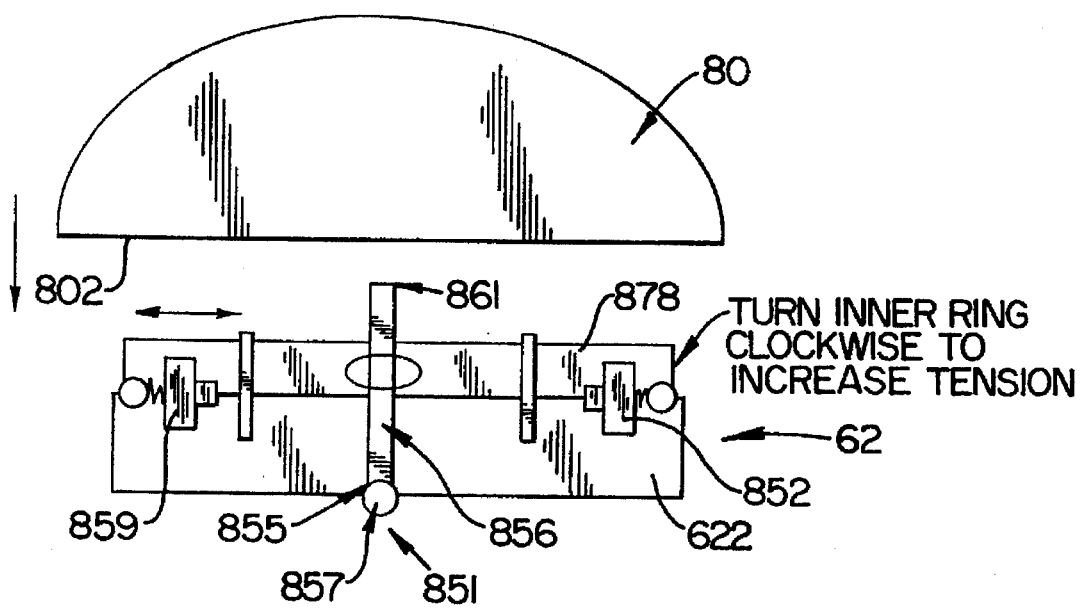
FIG. 8 is a side cross-sectional view of the dome for the slotted-base device.
Figure 10:
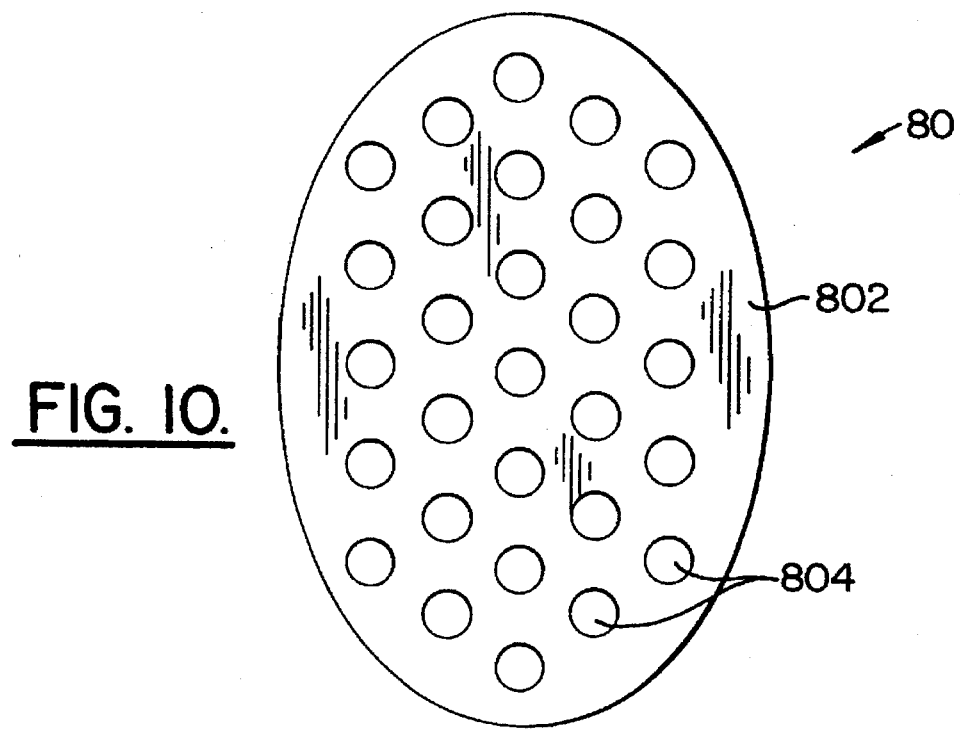
FIG. 10 illustrates a bottom plan view of the dome.

Dome 80 is movably supported upon the dome support structure 62 as shown in FIG. 8. Rod 856 protrudes through and above the dome support base 622, the top end 861 movably insertable into a hole 804 in the dome bottom 802. As shown in FIG. 10, flexibility in dome position is provided by providing a plurality of holes 804 into which rod 856 may be inserted. Typically a generally central hole 804 would be chosen.

Figure 6:
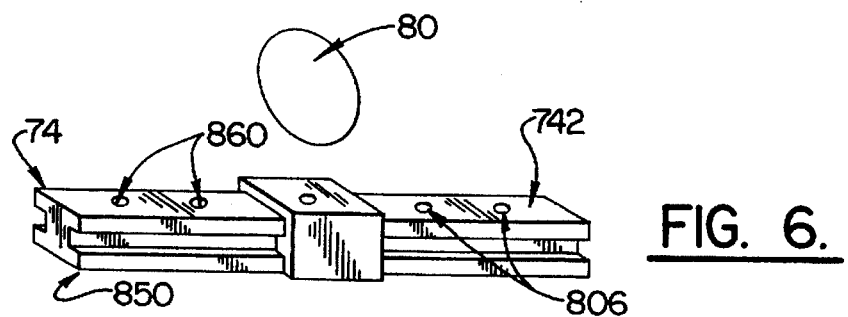
FIG. 6 is a perspective view of the dome-support track mechanism for the slotted-base device.

The dome support base 622 is slidably affixed to a track 74, which is positioned with its long axis along the base top slot 702 (FIG. 6). Along the top 742 of the track 74 are positioned a plurality of indentations 860, each of which houses a second contact switch 806.

At the bottom end 855 of rod 856 is a protrusion 857, which is dimensioned to fit within the indentations 860. When the dome support structure 62 is positioned within a sector 706, a tactile sensation communicates to the user that a sector 706 has been entered. A downward movement of the dome 80 causes the dome 80 to press against the rod 856, the bottom protrusion 857 of which in turn presses against and activates the second contact switch 806, the result of which will be discussed below.

The dome 80 is also movable relative to the dome support structure 62, the movement generally in a direction perpendicular to the base top slot 702. First contact means are positioned within the dome support structure 62 that are activatable by moving the dome 80 relative to the dome support structure 62 to an activating position. In the embodiment illustrated in FIGS. 7 and 8, two contact switches, a fore 858 and an aft 859 contact switch, are positioned within the dome support means, respectively, adjacent a top and a bottom section of the dome support structure 62.

Within the dome support structure 62 is housed a plate system 85 comprising a lower stationary (relative to the dome support structure 62) plate 880 and an upper movable (relative to the lower 880) plate 87. Relative movement is caused by the dome 80 moving the rod 856, which since it protrudes through movable upper plate 87, also moves the upper plate 87. Two stops, an aft 884 and a fore 883, downwardly protrude from upper plate 87, in a position so that a movement in the aft direction forces aft stop 884 against aft contact switch 858, and, similarly, a movement in the fore direction forces fore stop 883 against fore contact switch 859. An activation of either of these contact means is adapted to generate a first signal representing a fore or an aft movement.

Flexibility in the amount of "throw" needed to cause this activation is provided by the stops 883,884 being movable within slots 878 to either increase or decrease the amount of dome movement required to move the upper plate 87 against one of the stops.

The dome plate system 85 also comprises a support plate 624, which has an elongated slot 626 dimensioned to expose upper plate 87 to permit rod 856 movement therethrough.

As discussed above, a second signal indicative of the sector within which the dome is positioned may be generated by pressing the dome downward and activating the second contact switch 706. The correlation of the first and the second signal provides a unique keystroke signal.

Figure 7:
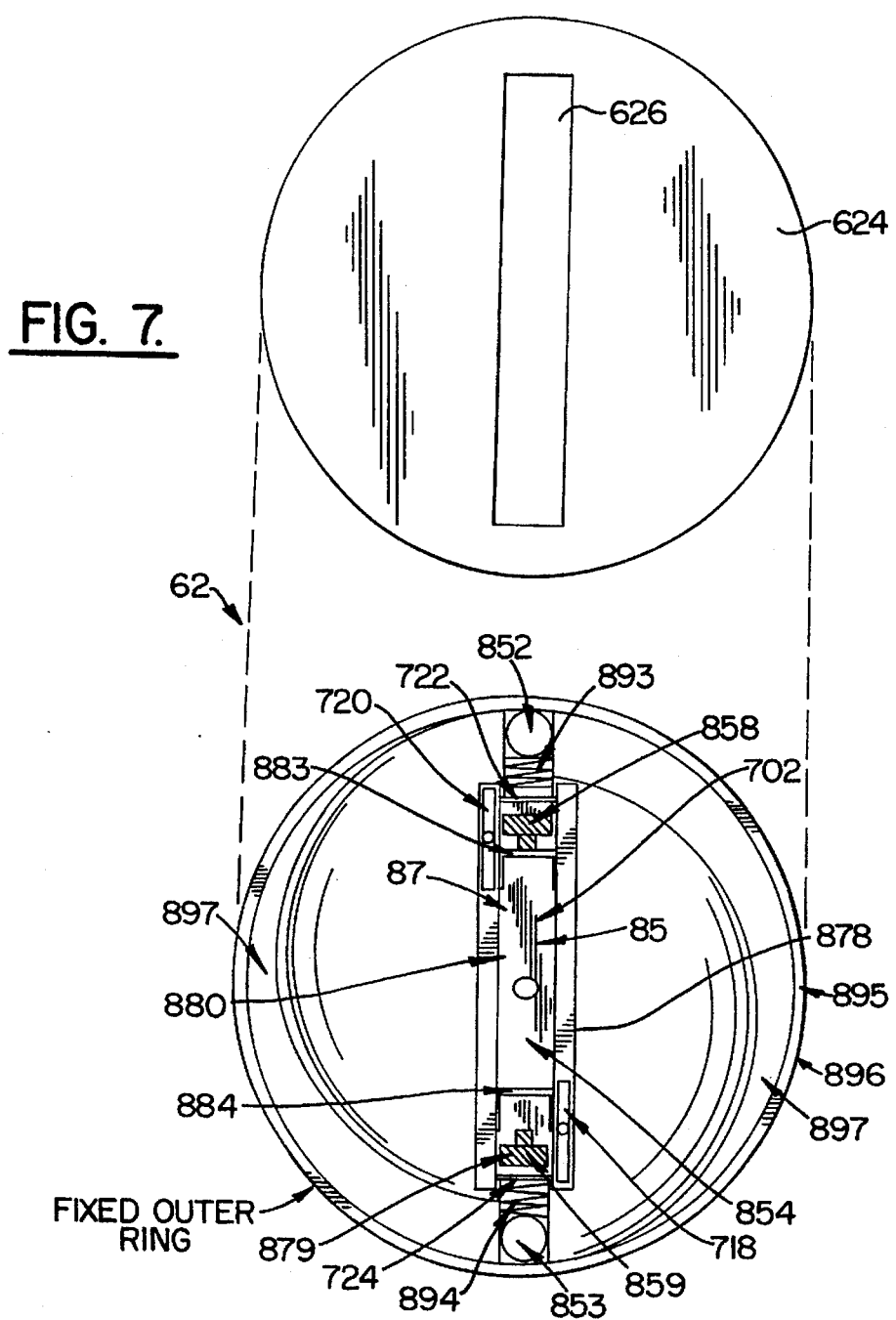
FIG. 7 is a top plan view of the dome tensioning mechanism and keys, also illustrating the support plate that rests thereon.

Means are also provided for adjusting the force required to move the dome 81 along the tracks 758,760, which is shown in FIG. 7. The force is increased by increasing the compression of the springs 893,894 against which the ball bearings 852,853 bear, which is accomplished by turning the spring support plate 895 within the dome support plate 896, which has a pair of spiral-shaped shoulders 897 that support the inner ends of the springs 893,894.

As above for the swiveling dome embodiment 10, a system for providing an increased number of possible keystroke signals comprises a pair of input devices 60,60' (FIG. 5).

Again, the sensed position of the sensing means is correlatable with a position signal (referred to above as a keystroke signal for a single-input-device embodiment) from each input device 60, and the pair of position signals are correlatable with a unitary keystroke signal. In use a user slides the dome 80 of one input device 60 with a left hand to a desired left position and the dome 80' of the other input device 60' with a right hand to a desired right position. The correlating means then correlates the pair of sensed position signals with a desired keystroke signal.

An exemplary key layout is shown in FIG. 9. Corresponding indicia may be placed on the base 70,70' above and below the slot 702,702' to provide the user with the dome positions needed to output a desired keystroke signal. For example, if the left-hand dome 80 is in Position 1 to activate contact switch 806 by pressing dome 80 downward, any of the slot top edge letters given in indicia line 1 728, q, w, e, r, or t, may be output by moving the right-hand dome 80' against the right-hand dome fore contact switch 858.

Activating capital letters may be accomplished in a number of ways. For instance, instead of clicking left-hand dome 80 downward and releasing, dome 80 may be kept depressed while activating the desired switch with the right-hand dome 80'.

It may be appreciated by one skilled in the art that a large number of variants are possible on the key layout and the means of sensing and activating keys; therefore, the above descriptions are not meant to be limiting. In addition, such an input device is usable with telephones, calculators, and in a miniaturized version for hand-held devices.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An input device for generating a keystroke signal, the input device comprising:

a base having a bottom and a generally planar top;

a dome shaped generally to conform to a shape of a human hand at rest and having a generally smooth bottom edge to permit a smooth sliding movement upon the base top;

dome support means for supporting the dome for sliding movement upon the base top; and means in communication with the dome support means for sensing a position of the dome upon the base top, the sensed position correlatable with a keystroke signal;

wherein:

the position-sensing means comprises a downwardly depending protrusion;

the base further comprises a generally circular groove dimensioned to accommodate the protrusion;

the dome support means has a top end swivelable about a dome support means bottom end;

when the protrusion is positioned in the groove, the dome is moveable in a generally circular path, the protrusion tracking along the groove; and the position-sensing means further comprises means for sensing a radial position of the protrusion.

2. The input device recited in claim 1, wherein the groove has a plurality of indentations therein for dividing the groove into radial sectors and for providing an indication of a radial sector location of the dome to a user.

3. The input device recited in claim 2, further comprising means in communication with the position-sensing means for correlating the sensed radial sector location with a keystroke signal.

4. The input device recited in claim 3, further comprising means in communication with the position-sensing means for outputting the keystroke signal to a processor.

5. The input device recited in claim 1, wherein the dome has an indentation therein shaped to conform to a palm side of a hand of a particular user at rest for improving ergonomic characteristics.

6. An input device for generating a keystroke signal, the input device comprising:

a base having a bottom and a generally planar top;

a dome shaped generally to conform to a shape of a human hand at rest and having a generally smooth bottom edge to permit a smooth sliding movement upon the base top;

dome support means for supporting the dome for sliding movement upon the base top; and means in communication with the dome support means for sensing a position of the dome upon the base top, the sensed position correlatable with a keystroke signal;

wherein the base top has a hole therein located generally in a center thereof and the dome support means comprises:

a support member having a bottom end affixed to the base bottom and a top end extending through the hole in the base top;

a generally horizontal first arm pivotably affixed at a first end to the support member top end and having a second end, the first arm pivotable generally in a horizontal plane;

a generally vertical second arm pivotably affixed adjacent a bottom end to the first arm second end, the second arm pivotable generally about a vertical axis;

means affixed atop the second arm for pivotably coupling the second arm to the dome; and the dome support means thereby supporting the dome for pivotable movement upon the base in a generally circular path.

7. The input device recited in claim 6, wherein the position-sensing means comprises means for sensing a radial position of the dome relative to the support member.

8. The input device recited in claim 7, wherein:

the first arm has a height generally commensurate with a vertical distance from the base bottom to the base top;

the second arm has a protrusion downwardly depending from the second arm bottom end;

the base top has a generally circular groove therein circumscribing the base top hole and radially positioned to be matable with the protrusion, the protrusion and the groove for facilitating the circular sliding of the dome on the base.

9. The input device recited in claim 8, wherein the groove has a plurality of indentations therein for dividing the groove into radial sectors and for providing an indication of a radial sector location of the dome to a user.

10. The input device recited in claim 9, further comprising means in communication with the position-sensing means for correlating the sensed radial sector location with a keystroke signal.

11. The input device recited in claim 10, further comprising means in communication with the position-sensing means for outputting the keystroke signal to a processor.

12. The input device recited in claim 6, wherein the dome has an indentation therein shaped to conform to a palm side of a hand of a particular user at rest for improving ergonomic characteristics.

13. An input device for generating a keystroke signal, the input device comprising:

a base having a bottom and a generally planar top;

a dome shaped generally to conform to a shape of a human hand at rest and having a generally smooth bottom edge to permit a smooth sliding movement upon the base top;

dome support means for supporting the dome for sliding movement upon the base top; and means in communication with the dome support means for sensing a position of the dome upon the base top, the sensed position correlatable with a keystroke signal;

further comprising arm support means comprising:

a support portion for supporting a forearm of a user;

a base holder having means for affixing the base thereto;

means for pivotably affixing the base holder to an inner distal section of the support portion, the affixing means lockable in one of a plurality of positions; and an extendable joint portion affixed at a proximal edge to a distal edge of the support portion and at a distal edge to an outer section of the base holder, the joint portion adapted to fan out along an outer edge, the joint portion and the affixing means thereby permitting the base holder to be moved in an inward and a distal direction and further permitting a user to lockably orient the base holder and the support portion in an optimal position for maximum comfort of a hand, a wrist and a forearm.

14. The input device recited in claim 13, wherein the dome has an indentation therein shaped to conform to a palm side of a hand of a particular user at rest for improving ergonomic characteristics.

15. A system for generating a keystroke signal, the system comprising:

a pair of input devices, each input device comprising:
   a base having a bottom and a generally planar top;
   a dome shaped generally to conform to a shape of a human hand at rest and having a generally smooth bottom edge to permit a smooth sliding movement upon the base top;
   dome support means for supporting the dome for sliding movement along the base top; and
   a plurality of means spacingly positioned along the base top for sensing a position of the dome, the sensed position correlatable with a position signal;
   means for sensing the pair of position signals from the pair of input devices; and
   means for correlating the pair of sensed position signals with a unitary keystroke signal;
   wherein in use a user slides the dome of one input device with a left hand to a desired left position and the dome of the other input device with a right hand to a desired right position and the correlating means correlates the pair of sensed position signals with a desired keystroke signal;

further comprising a pair of arm support means, each arm support means comprising:
   a support portion for supporting a forearm of a user;
   a base holder having means for affixing the base thereto;
   means for pivotably affixing the base holder to an inner distal section of the support portion, the affixing means lockable in one of a plurality of positions; and
   an extendable joint portion affixed at a proximal edge to a distal edge of the support portion and at a distal edge to an outer section of the base holder, the joint portion adapted to fan out along an outer edge, the joint portion and the affixing means thereby permitting the base holder to be moved in an inward and a distal direction and further permitting a user to lockably orient the base holder and the support portion in an optimal position for maximum comfort of a hand, a wrist, and a forearm.

* * * * *